(12) United States Patent
Carroll, III et al.

(10) Patent No.: US 6,832,748 B2
(45) Date of Patent: Dec. 21, 2004

(54) OUTWARDLY OPENING, SEAT-SEALED, FORCE BALANCED, HYDRAULIC VALVE AND ACTUATOR ASSEMBLY

(75) Inventors: John T. Carroll, III, Columbus, IN (US); Donald J. Benson, Columbus, IN (US)

(73) Assignee: Cummins Inc., Columbus, IN (US)

(*) Notice: Subject to any disclaimer, the term of this patent is extended or adjusted under 35 U.S.C. 154(b) by 92 days.

(21) Appl. No.: 10/001,784

(22) Filed: Dec. 5, 2001

(65) Prior Publication Data

US 2003/0102451 A1 Jun. 5, 2003

(51) Int. Cl.$^7$ ............................................. F16K 31/12
(52) U.S. Cl. ........................ 251/30.01; 251/129.07; 251/282
(58) Field of Search .................. 251/30.01, 129.07, 251/282

(56) References Cited

U.S. PATENT DOCUMENTS

| | | |
|---|---|---|
| 2,601,989 A | 7/1952 | Modes |
| 2,747,612 A | 5/1956 | Lee |
| 2,826,215 A | 3/1958 | Wolfslau et al. |
| 2,897,836 A | 8/1959 | Peters et al. |
| 3,038,499 A | 6/1962 | Dumm |
| 3,756,558 A | 9/1973 | Okui |
| 4,395,987 A | 8/1983 | Kobayashi et al. |
| 4,491,111 A | 1/1985 | Eheim et al. |
| 4,563,133 A | 1/1986 | Yasuhara |
| 4,583,509 A | 4/1986 | Schechter et al. |
| 4,598,736 A | 7/1986 | Chorkey |
| 5,050,642 A | 9/1991 | Bright |
| 5,058,553 A | 10/1991 | Kondo et al. |
| 5,115,783 A | 5/1992 | Nakamura et al. |
| 5,138,997 A | 8/1992 | Fehlmann |
| 5,199,855 A * | 4/1993 | Nakajima et al. ........... 417/295 |
| 5,201,297 A | 4/1993 | Eblen et al. |
| 5,301,875 A | 4/1994 | Gant et al. |
| 5,347,970 A | 9/1994 | Pape et al. |
| 5,396,926 A | 3/1995 | Pataki et al. |
| 5,540,412 A * | 7/1996 | Doll ...................... 251/129.07 |
| 5,551,466 A | 9/1996 | De Pieri |
| 5,639,066 A * | 6/1997 | Lambert et al. ............ 251/282 |
| 5,676,114 A | 10/1997 | Tarr et al. |
| 5,983,863 A | 11/1999 | Cavanagh et al. |
| 6,045,120 A | 4/2000 | Tarr et al. |
| 6,415,820 B1 * | 7/2002 | Gluf, Jr. ............... 137/625.65 |
| 6,488,050 B1 * | 12/2002 | Jabcon ................. 137/625.65 |

* cited by examiner

Primary Examiner—Joseph A. Kaufman
(74) Attorney, Agent, or Firm—Nixon Peabody LLP; Tim L. Brackett, Jr.; J. Bruce Schelkopf

(57) ABSTRACT

The valve includes a valve element with an internal longitudinal bore and cross-drilled orifices which, in combination with other orifices and restrictions, force balance the valve in an open configuration when attached to a pump assembly in a spilling mode.

29 Claims, 7 Drawing Sheets

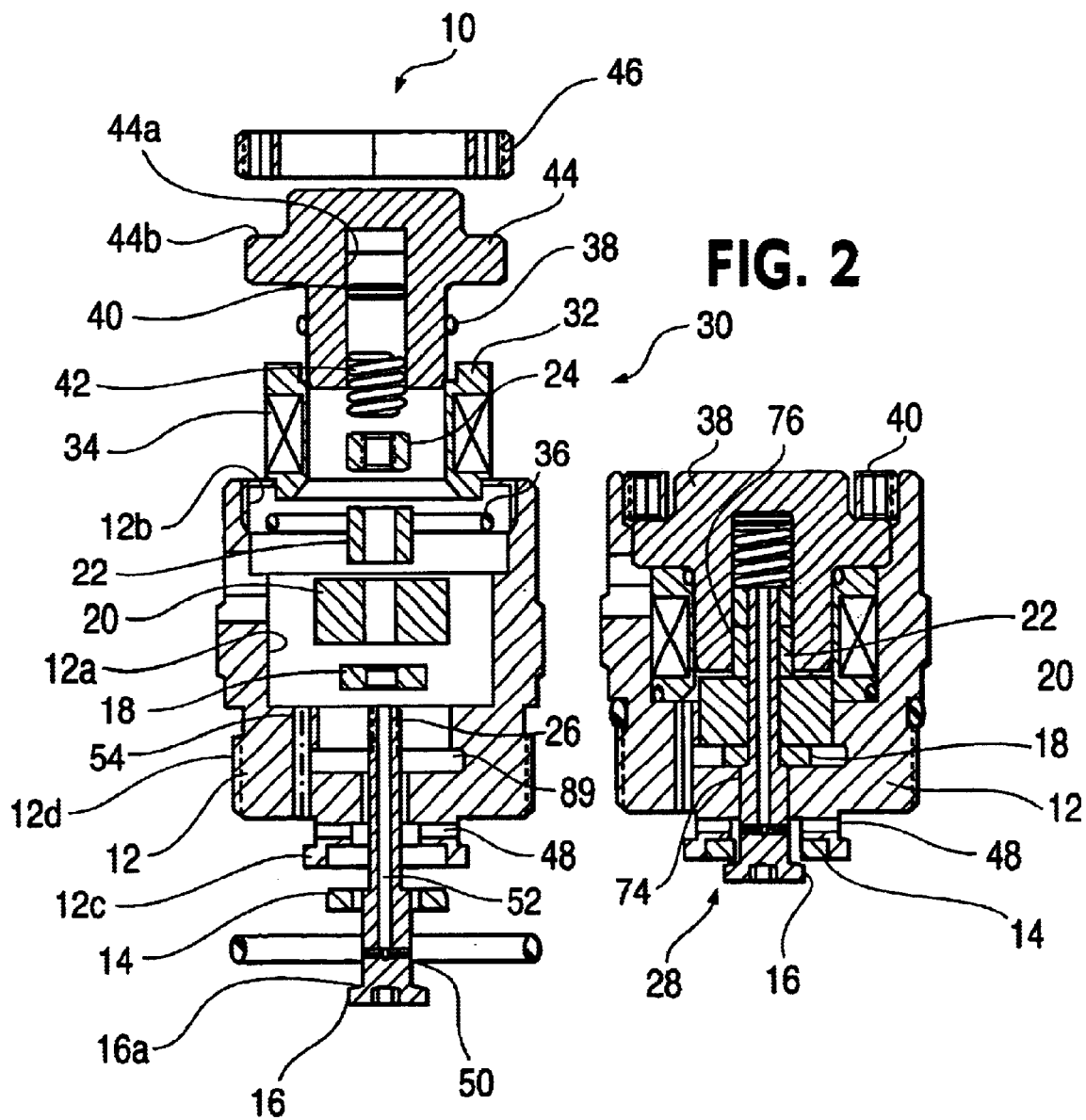

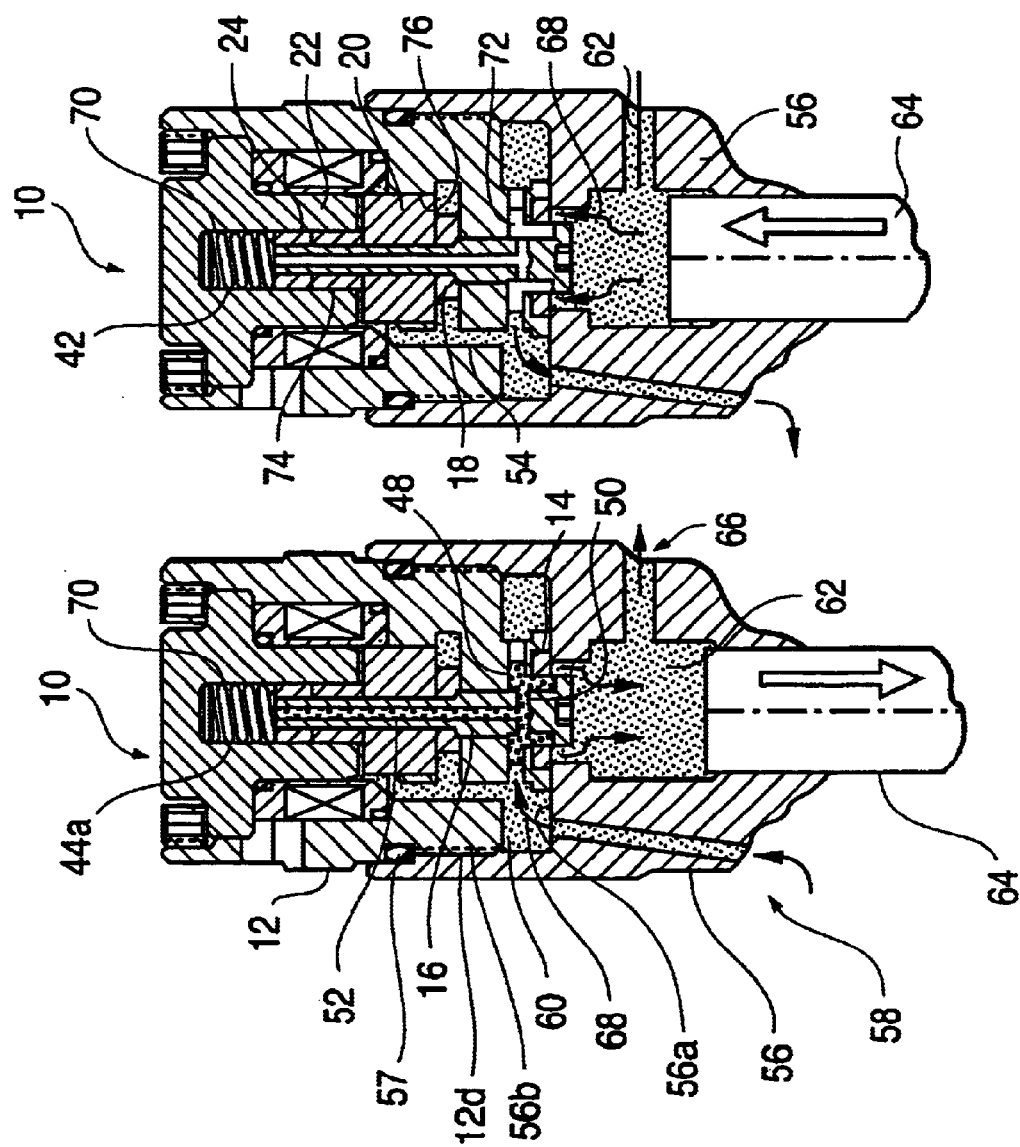

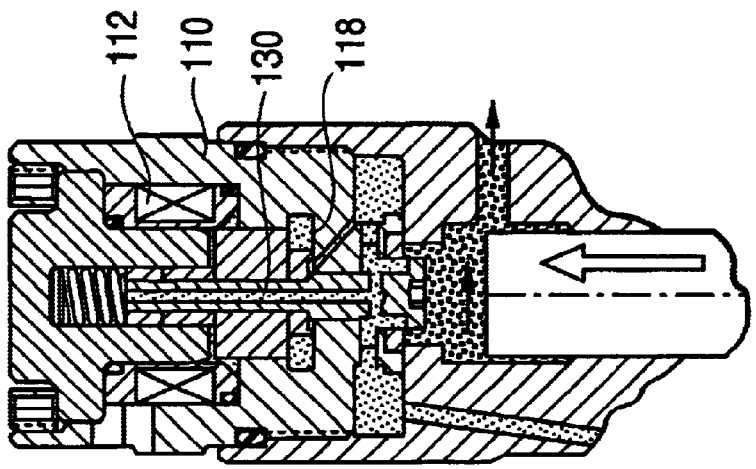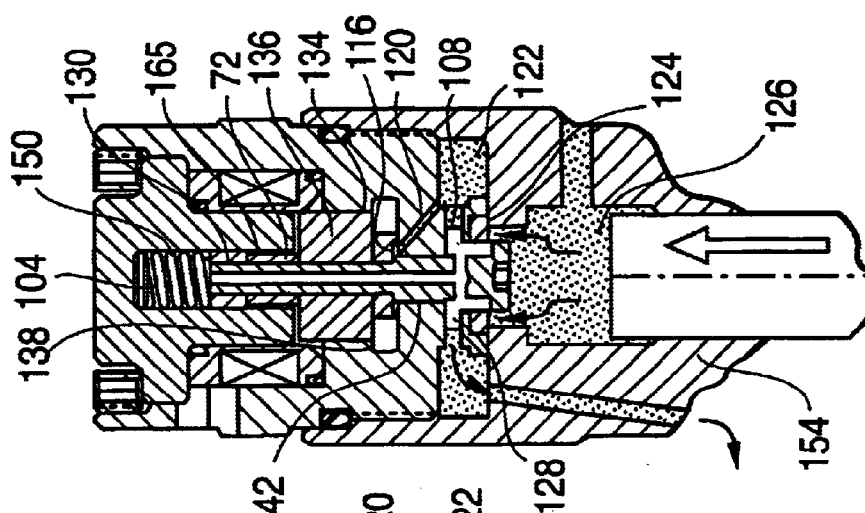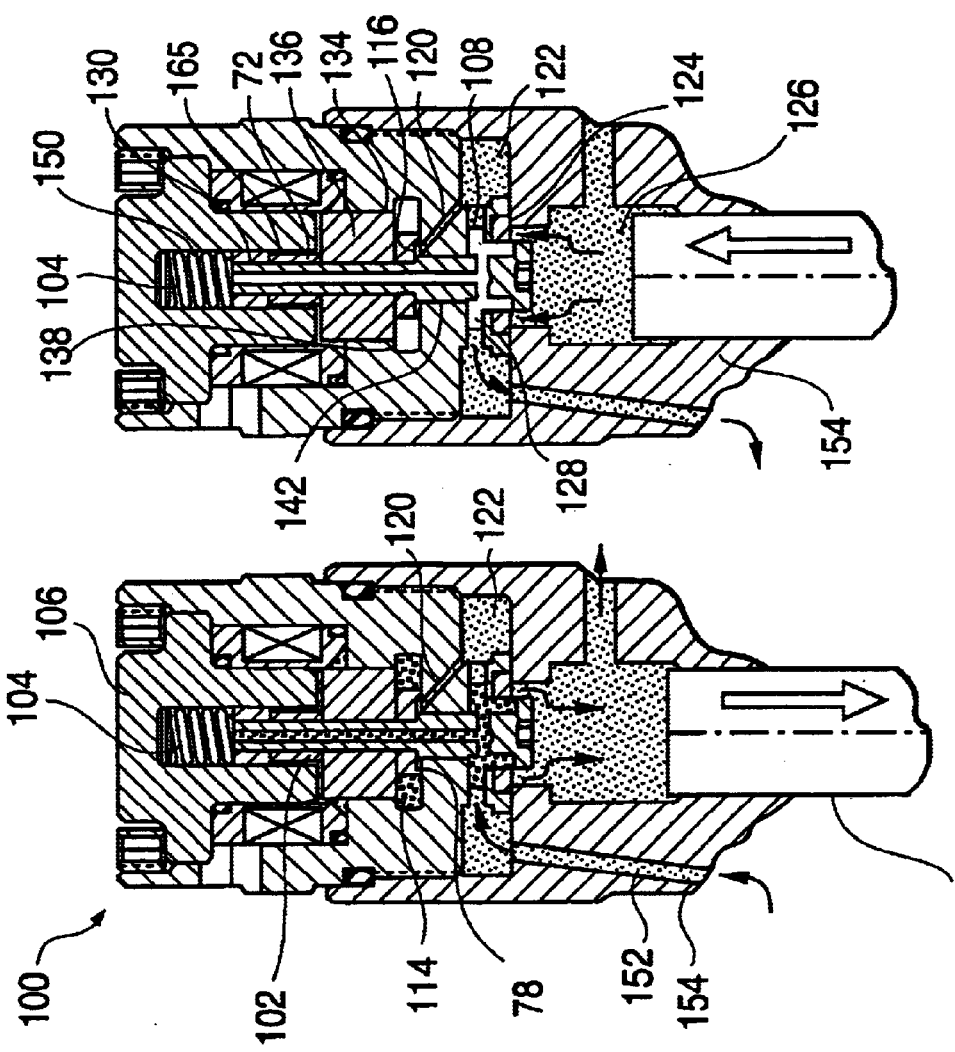

OUTWARDLY OPENING, SEAT-SEALED, FORCE BALANCED, HYDRAULIC VALVE AND ACTUATOR ASSEMBLY

BACKGROUND OF THE INVENTION

1. Field of the Invention

The present invention relates generally to hydraulic valves and actuator assemblies. More particularly, the present invention relates to a hydraulic valve and actuator assembly that includes an outwardly opening, seat-sealed, force balanced needle valve.

2. Description of Related Art

Improved energy efficiency and pressure control responsiveness have been demonstrated in advanced diesel fuel injection systems that utilize cyclic energy storage and recovery operating principles. One benefit of an outwardly opening valve is that the pressurized fluid can maintain (or hydraulically latch) the valve in a closed state during an energy storage cycle after only a brief actuation to close the valve. Hydraulic latching allows externally supplied actuation energy to be conserved and for valve reopening to be passively synchronized with the conclusion of the energy recovery cycle and the beginning of the refilling cycle. A benefit of a seat-sealed valve is that parasitic leaks are virtually eliminated. Eliminating parasitic leaks improves energy efficiency, power density, and performance. A disadvantage of the outwardly opening feature is that an excessive pressure drop can develop across the valve during a spill cycle that encourages premature closing (or blow-shut). A blow-shut may result in greater than desired operating pressures. Conventional approaches to address this problem include increasing the strength of the spring that holds the valve in an open position and utilizing a change of flow momentum to counteract the blow-shut problem. The systems that increase the strength of the spring increase not only the size and cost of the spring, but also the size and cost of the actuator because the actuator must be able to overcome the spring to close the valve and to keep the valve closed. The systems that utilize a change in flow momentum incur substantial flow loss penalties.

Conventional valve assemblies have relied upon the de-energization of a valve actuator to open the valve. The timing of this opening with the pump has caused problems, in that the valve may be opened prematurely, in which case the energy expended to increase the pressure in the pump is lost into the supply, or the valve may be opened too late, in which case the pump expends energy in creating a vacuum in the pump chamber and may even reduce the pressure of the system being supplied by the pump. Additional sensing and control elements can be considered to minimize or eliminate these problems at the expense of additional cost, complexity, and unreliability.

SUMMARY OF THE INVENTION

An exemplary embodiment of the invention coordinates the flow restrictions and accompanying pressure differentials through the valve assembly with the surface areas upon which those pressures act to control the forces operating on the valve. An exemplary embodiment of the invention provides an outwardly opening, seat-sealed and force balanced valve. The exemplary embodiment of the invention performs at least one of the following functions of eliminating premature closing or blow-shut; reducing actuator force; controlling logic and electrical requirements; increasing the minimum flow cross-section; reducing the package size; and supporting advanced valve motion diagnostics using electromagnetic force feedback.

An exemplary embodiment of the invention enables the valve actuator to be de-energized while the pump is increasing the pressure by relying upon the hydraulic latching of the valve in a closed position. Since, the actuator is de-energized, as soon as the pump piston reduces the pressure in the pump chamber to a pressure that is lower than the supply pressure, the valve opens by itself.

The exemplary embodiment of the invention reduces the spring strength that is required to maintain the valve in an open configuration by controlling the forces exerted on a movable valve element such that the movable valve element is biased open during a spilling mode. Since the strength of the spring biasing the valve open may be reduced, the strength of the actuator of the exemplary embodiment may also be reduced. Therefore, a smaller and more compact actuator, spring and overall valve package size may be obtained for a given flow handling capacity on a cycle by cycle basis.

While preserving the advantages of an outwardly opening valve, an exemplary embodiment of the invention provides a more nearly balanced application of fluid forces on the valve element, while in its open position, to help prevent premature closing or latching of the valve. Accordingly, an exemplary embodiment of the invention finds particular utility in diesel fuel systems that utilize cyclic energy storage and recovery.

Additionally, low actuation force requirements permit electro-magnetic actuators to be operated without magnetic saturation, thereby allowing the coil assembly of the actuator to be used to sense the position of the movable valve assembly within the valve body. The coil assembly may therefore be used to generate a signal that may be used in advanced valve motion diagnostics using electromagnetic force feedback.

An exemplary embodiment of the present invention maximizes the flow capacity of the valve while simultaneously reducing the pressure drop through the valve and, thereby, improves the efficiency of the valve. The movable valve assembly of the present invention is also designed such that the surface areas exposed to the fluid pressures within the valve body operate to balance the forces upon the movable valve assembly. The pressures within the valve body which operate upon the surface areas of the movable valve assembly are controlled based upon the flow of the fluid upstream through the valve and upon the restrictions through which the fluid flows. The restrictions to flow may be reduced by increasing the surface area of the movable valve assembly exposed to the pressures within the valve body. In this manner, the upstream flow restrictions may be reduced.

In an exemplary embodiment of the invention a first chamber is formed above a radially extending portion of a movable valve element and a predetermined flow restriction is formed upstream of the first chamber which is more restrictive than the flow restriction formed between the radially extending portion of the movable valve element and the adjacent valve seat. Thus, when the valve is in its open position and the flow of fluid through the valve reverses (in a spilling mode), the pressure in the first chamber will tend to increase to tend to maintain the valve element in its open position. An internal passage within the movable valve element places the first chamber in fluid communication with a second chamber above the movable valve element to add further force tending to hold the valve element open during reverse flow of fluid through the valve.

BRIEF DESCRIPTION OF THE DRAWINGS

Exemplary embodiments of this invention will be described in detail, with reference to the following figures, wherein:

FIG. 1 is an exploded, cross-sectional, assembly view of a first exemplary embodiment of a valve in accordance with the invention;

FIG. 2 is an assembled view of the valve of FIG. 1;

FIG. 3 is a cross-sectional view of the valve of FIG. 1 assembled to a pump body while in a filling mode;

FIG. 4 is a cross-sectional view of the valve and pump body of FIG. 3 while in a spilling mode;

FIG. 5 is a cross-sectional view of the valve and pump body of FIG. 3 while in a pumping mode;

FIG. 8 is a cross-sectional view of a second exemplary embodiment of a valve in accordance with the invention assembled to a pump body in a filling mode;

FIG. 9 is a cross-sectional view of the valve and pump body of FIG. 8 in a spilling mode;

FIG. 10 is a cross-sectional view of the valve and pump body of FIG. 8 in a pumping mode;

Figure 6:
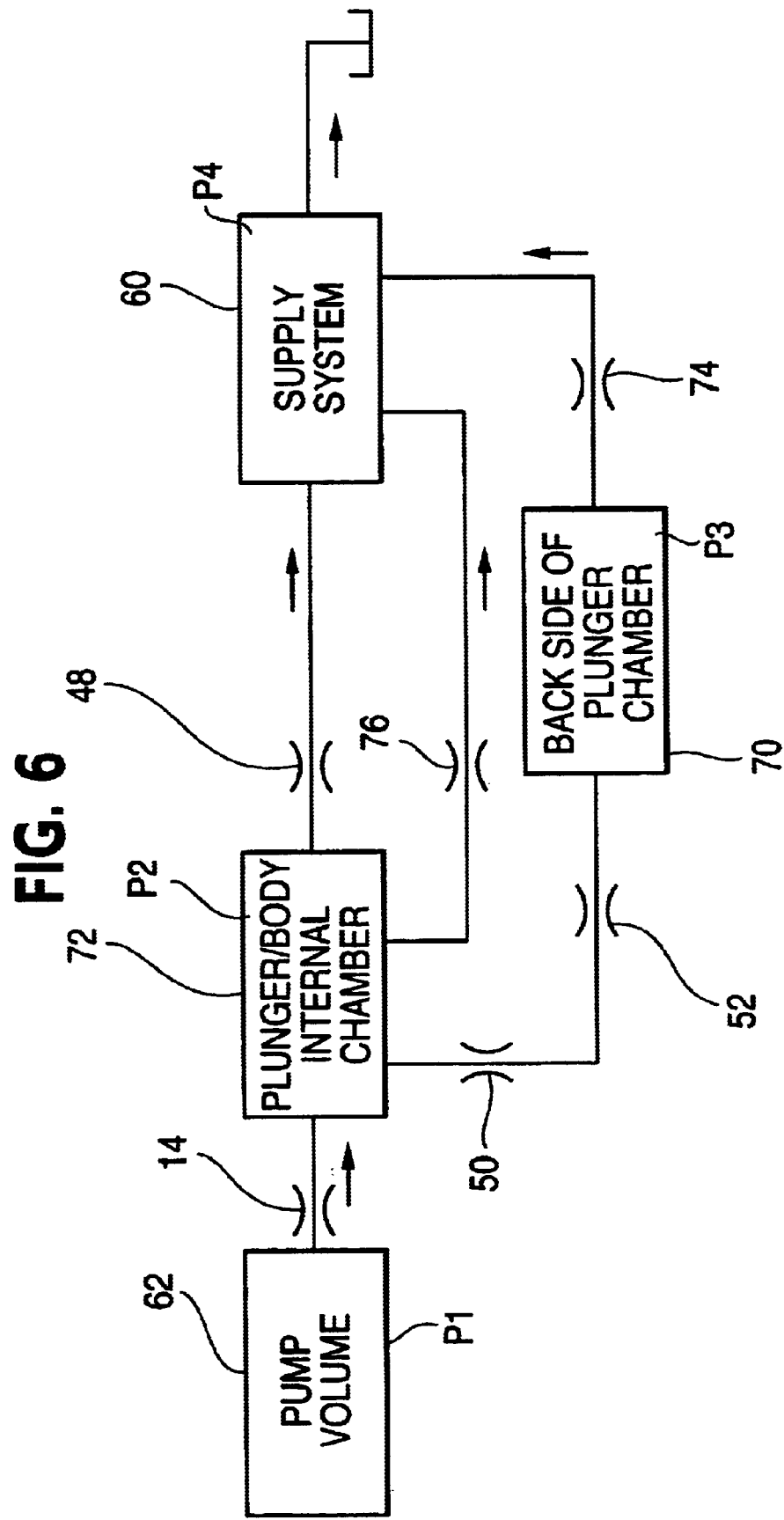
FIG. 6 is a schematic diagram of the flow through the first exemplary embodiment of the valve in the spill mode.

These and other features and advantages of this invention are described in or are apparent from the following detailed description of the exemplary embodiments.

DETAILED DESCRIPTION OF EXEMPLARY EMBODIMENTS

To facilitate understanding, portions of the assembly will be referred to as "upper" or "lower" in reference to the orientation of the assembly in the various views, but it should be understood that the assembly, when used, may take various orientations different from those illustrated in the drawings. Additionally, the direction of flow may be referred to as being in an "upstream" or "downstream" direction depending upon whether the fluid flows into the fluid supply or from the fluid supply, respectively.

FIG. 1 shows an exploded, assembly, cross-sectional view of a first exemplary embodiment of a valve 10 in accordance with the invention. The valve 10 includes a body 12 receiving a seat 14. A movable valve element 16 passes through the assembled seat 14 and body 12 and subsequently passes through a clearance fit spacer 18, armature 20 and sleeve 22. An internally threaded nut 24 may be rotationally advanced into engagement with an externally threaded portion 26 of the movable valve element 16 to clamp the spacer 18, armature 20 and sleeve 22 onto the valve element 16. The resulting valve assembly 28 (see also FIGS. 2 and 7) slidably moves within the body 12. An open position stop for the valve assembly 28 is provided by the spacer 18 contacting the body 12 and a closed position stop for the valve assembly 28 is provided by the valve element 16 contacting the seat 14 that is received by the body 12. The lower end of valve element 16 is radially enlarged to form an "outwardly opening" valve meaning that, upon upward movement of valve element 16, the upper surface 16a of the radially enlarged portion will come into contact with valve seat 14 to arrest further upward movement. As fluid pressure develops on the downstream side of valve element 16, the radially enlarged portion will be pushed with greater force toward the valve's closed position to "latch" the valve in its closed position.

An electrical coil assembly 30 including a bobbin 32, wound coil 34, lower o-ring 36 and upper o-ring 38, fits into the body 12 and around the captive valve assembly 28. A shim 40 and spring 42 are inserted into a spring cavity 44a of pole 44 and the resulting coil assembly 30 may be operatively positioned within an upwardly opening coil receiving cavity 12a of body 12 as farther illustrated in FIG. 2. In this operative position, the upper end of valve assembly 28 is received within the spring receiving cavity 44a. During this assembly sequence, the spring 42 is compressed between the shim 40 and the nut 24 of the valve assembly 28 to preload the valve assembly 28 against its open position stop. Finally, an externally threaded retainer 46 engages internal threads 12b at the upper end of coil receiving cavity 12a to bear against the upper surface 44a of pole 44 to trap the coil assembly 30 within cavity 12a.

The valve body 12 includes cross-drilled orifices 48 that pass through a lower projection 12c of the valve body 12 adjacent the lower end of the movable valve element 16. The cross-drilled orifices 48 are in general alignment with cross-drilled orifices 50 in the movable valve element 16 when operatively assembled. The cross-drilled orifices 50 are in fluid communication with a longitudinal bore 52 extending from the cross-drilled orifices 50 to the opposite end of the movable valve element 16 into the spring receiving cavity 44a. The valve body 12 also includes a fluid communication passage 54 extending from the lower side of body 12 to the lower portion of cavity 12a and intersecting annular cavity 89.

FIGS. 3–5 show cross-sectional views of the valve 10 of FIG. 2 assembled to a pump body 56 and illustrate the three operating states. The pump body 56 includes a supply passage 58 which is in fluid communication with an upwardly opening cavity 56a having internal threads 56b adapted to engage the external threads 12d of body 12 of valve 10 whereby valve 10 may be rotationally advanced into cavity 56a to an operative position to create an annular cavity 60 in the lower portion of cavity 56a. Annular cavity 60 is sealed by means of an o-ring 57. The pump body 56 also encloses a pump chamber 62 which is adapted to slidably receive a pump piston 64. The pump chamber 62 is in fluid communication with an exit port 66 in the pump body 56 through which fluid, such as diesel fuel may be pumped. Although not illustrated, port 66 may lead to a check valve arranged to permit only outflow of fluid from pump chamber 62.

The assembly of FIGS. 3–5 may be usefully employed in a number of fluidic systems but it has particular utility in fuel injection systems utilizing cyclic energy storage and recovery operating principles such as disclosed in U.S. Pat. Nos. 5,676,114 and 5,819,704 which, are hereby incorporated by reference in their entirety. These systems disclosed in those patents have the ability to recover the compression energy temporarily imparted to the pumped fluid during the upward stroke of pump piston 64 as the piston reverses its direction for its downward stroke. In particular, the energy stored in the fluid may be returned to the mechanism (not illustrated) for moving piston 64 such as a cam operated tappet as explained more fully in the '114 and '704 patents.

FIG. 3 shows a cross-sectional view of the valve assembly 10 assembled to the pump body 56 while the pump body 56 is in a filling mode. In FIG. 3, the valve element 16 is in the open position while the piston 64 moves downward and allows fluid from the supply port 58 to flow into the pump chamber 62. The fluid flows from the upstream supply port 58 along a fluid flow path 68 through the annular cavity 60, through the cross-drilled orifices 48 on the valve body 12 into a first chamber 72 (FIG. 4) and between the valve seat 14 and the movable valve element 16 into the downstream pump chamber 62.

Along the fluid flow path 68, the cross-drilled orifices 48 on the body 12 inherently form a predetermined flow restriction which creates a pressure drop as the fluid passes through the orifices 48. The fluid also experiences a second pressure drop as it flows between the seat 14 and the movable valve element 16 into the pump chamber 62. The pressure of the fluid in the first chamber 72 between the cross-drilled orifices 48 and the valve seat 14 is communicated through the cross-drilled orifices 50 and the longitudinal bore 52 of the movable valve element 16 to a second chamber 70 (formed in spring cavity 44a above the upper end of valve element 16) such that the pressure of the fluid in the second chamber 70 is nearly equal to the pressure of the fluid in the first chamber 72.

FIG. 4 shows the position of valve assembly 10 within pump body 56 while the valve 10 operates in a spilling mode. In the spilling mode, the piston 64 moves toward the valve element 16 and, thereby, increases the pressure of the fluid within the pump chamber 62. In this spilling configuration, the fluid flow path 68 reverses and the fluid flows from the pump chamber 62 across the seat 14 into the first chamber 72, through the cross-drilled orifices 48 into the annular cavity 60 and into the upstream supply port 58. As explained earlier, the restrictions across the valve seat 14 and through the cross-drilled orifices 48 each generate a pressure drop. The cross-drilled orifices 48 have a predetermined upstream flow restriction to control the pressure drop and, in turn, the pressure of the fluid within the first chamber 72 as a function of the flow rate through the system.

Because the flow restriction past the valve seat 14 causes a pressure drop, the fluid in the pump chamber 62 is at a higher pressure than the fluid in the first chamber 72 between the seat 14 and the cross-drilled orifices 48. Additionally, the fluid in the first chamber 72 is also at a pressure that is higher than the fluid that is flowing through the annular cavity 60 because of the predetermined upstream flow restriction of the cross-drilled orifices 48. The forces on the valve assembly 28 which are generated by the fluid pressures can be balanced in such a manner that spring 42 only needs to provide a small force to bias the movable valve assembly 28 open in comparison to conventional valve springs in conventional valves. In fact, as will be discussed below, the spring may not be needed at all to keep the valve element open when fluid flow through the valve is reversed.

The bias is achieved by a design which takes advantage of the fluid pressures being exerted on the valve assembly 28 and the surface areas upon which these pressures operate. In a general, simplified analysis, the design of the valve 10 is such that the pressure in the second chamber 70 multiplied by the surface area over which that pressure acts generates a force on valve assembly 28 which acts in opposition to the force generated by the pressure in the pump chamber 62 multiplied by the surface area over which that pressure acts valve assembly 28. The invention coordinates the restrictions through which the fluid passes and the accompanying pressure drops with the amount of surface areas exposed to those pressures to control the forces upon the valve assembly 28 to control the positioning of the valve assembly 28 within the valve 10. A differential area is created by making the diameter of the sleeve 22 in the spring receiving cavity 44a larger than the diameter of the valve element 16 in the body 12. In the spilling mode, the pressure in the second chamber 70 is higher than the pressure in the annular cavity 60 of the valve. The differential area multiplied by the differential pressure produces a net force which acts to keep the valve open.

A third chamber 89 is formed around valve assembly 28 in the area of spacer 18 and armature 20. Third chamber 89 is connected to annular cavity 60 by fluid communication passage 54 to assist in achieving fluid force balance on valve assembly 28.

FIG. 5 shows the valve 10 assembled to the pump body 56 while the valve 10 is in a pumping mode. In the pumping mode, the pump piston 64 moves toward the valve 10 through the pump chamber 62. However, unlike in FIGS. 3 and 4, the wound coil 34 has been energized to attract the armature 20 of the valve assembly 28 upward to close the fluid flow path through the valve seat 14. Therefore, the fluid within the pump chamber 62 is forced out through the exit port 66. In this configuration, annular cavity 60 of valve 10 is fluidly isolated from the pump chamber 62. The fluid pressures throughout the valve 10 are equal and are lower than the pressures of the fluid within the pump chamber 62. Therefore, the force exerted on the valve face 84 by the high pressure fluid within the pump chamber 62 holds (hydraulically latches) the valve element 16 closed against the valve seat 14. The valve seat 14 seals against the valve element 16 and does not allow fluid to flow past the seat 14. The hydraulic forces exerted by the high pressure fluid within the pump chamber 62 are sufficient to maintain the valve element 16 in a closed state without an electromagnetic assist. Therefore, the valve actuator may be de-energized and energy may, thereby, be saved.

Once pump piston 64 completes its upward movement and finishes the pumping mode by reversing direction, the pump then returns to the filling mode shown in FIG. 3 wherein valve element 16 moves off of the valve seat 14 because the fluid pressure in the pump chamber 62 quickly becomes less than in the annular cavity 60 and the other areas surrounding the valve assembly 28. To the extent that the fluid in pump chamber 62 exhibits any compressibility, the valve element 16 will remain closed during the initial portion of the return stroke of pump piston 64. During this initial portion of the return stroke, energy is returned to pump piston 64 until the pressure in pump chamber 62 falls sufficiently low to allow the force of spring 42 and the fluid pressure on valve element 16 to move valve element 16 toward its open position.

The first exemplary embodiment of the invention shown in FIGS. 1–5 enables a pump to be connected to a low pressure fuel supply while minimizing hydraulic flow losses and permits energy stored in the pumped fluid to be returned to the actuation mechanism (not shown) of pump piston 64 during an initial portion of its return stroke. Additionally, the valve assembly allows the valve element 16 to close quickly and controllably to isolate a low pressure fuel supply from a pump upon energization of the wound coil 34 by a low power signal. The valve element 16 also maintains its closed state after de-energization of the wound coil 34 when the pump pressure exceeds the fluid supply pressure.

FIG. 6 is a schematic diagram of the flow through the first embodiment of the valve 10 in the spill mode. The flow proceeds from the pump chamber 62 at a pressure P1 past the valve seat 14 and into the first chamber 72 between the valve seat 14 and the cross-drilled orifices 50 of the movable valve element 16. The pressure of the fluid in the first chamber 72 is at a pressure P2. The flow then splits into three flow paths. The first flow path flows through the cross-drilled orifices 50 and the longitudinal bore 52 into the second chamber 70 which is at fluid pressure P3. The fluid in the second chamber 70 also flows through a first annulus 74 between the sleeve 22 and the spring receiving cavity 44a through the fluid communication passage 54 and into annular cavity 60 at a pressure P4. The second flow path flows from the first chamber 72 through the cross-drilled orifices 48 in the valve body 12 and into the annular cavity 60. The third flow path flows from first chamber 72 through a second annulus 76 between the valve element 16 and the valve body 12 and into the annular cavity 60 via the fluid communication passage 54.

The pressures P1 through P4 may be determined using standard flow rate equations. For example, the flow rate through an orifice, such as one of the cross-drilled $$Flowrate = K\left(A\sqrt{\frac{2(P2 - P4)}{Den}}\right) \quad (1)$$

orifices 48, may be calculated using the following equation:
Where:
  K is the discharge coefficient;
  A is the cross-sectional area of one of the cross-drilled orifices 48;
  P2 is the pressure in the first chamber 72;
  P4 is the pressure in the annular cavity 60; and
  Den is the density of the fluid.

Similarly the flow rates through each of the first and second annulus, 74 and 76 may also be determined. For example, the flow rate through the first annulus 74 may be determined using the following equation:

$$Flowrate = \left(\frac{(\pi \times Dia \times Clear^3 \times (P2 - P4))}{(12 \times Vis \times L)}\right) \times \left(1 + (1.5 \times E^2)\right) \quad (2)$$

Where:
  Dia is the mean diameter of the first annulus 74;
  Clear is the clearance in the first annulus 74;
  P2 is the pressure in the first chamber 72;
  P4 is the pressure in the annular cavity 60;
  Vis is the viscosity of the fluid;
  L is the length of the first annulus 74; and
  E is the eccentricity ratio.

Using these equations and by generating a mathematical model of FIG. 6, the pressures P1 through P4 may be determined for a given flow rate through the valve in the spill mode. The pressures may then be used to determine the forces being applied to the movable valve assembly 28 and the forces may then be balanced by optimizing areas on which pressures act over the valve's operational flow rate range.

Figure 7:
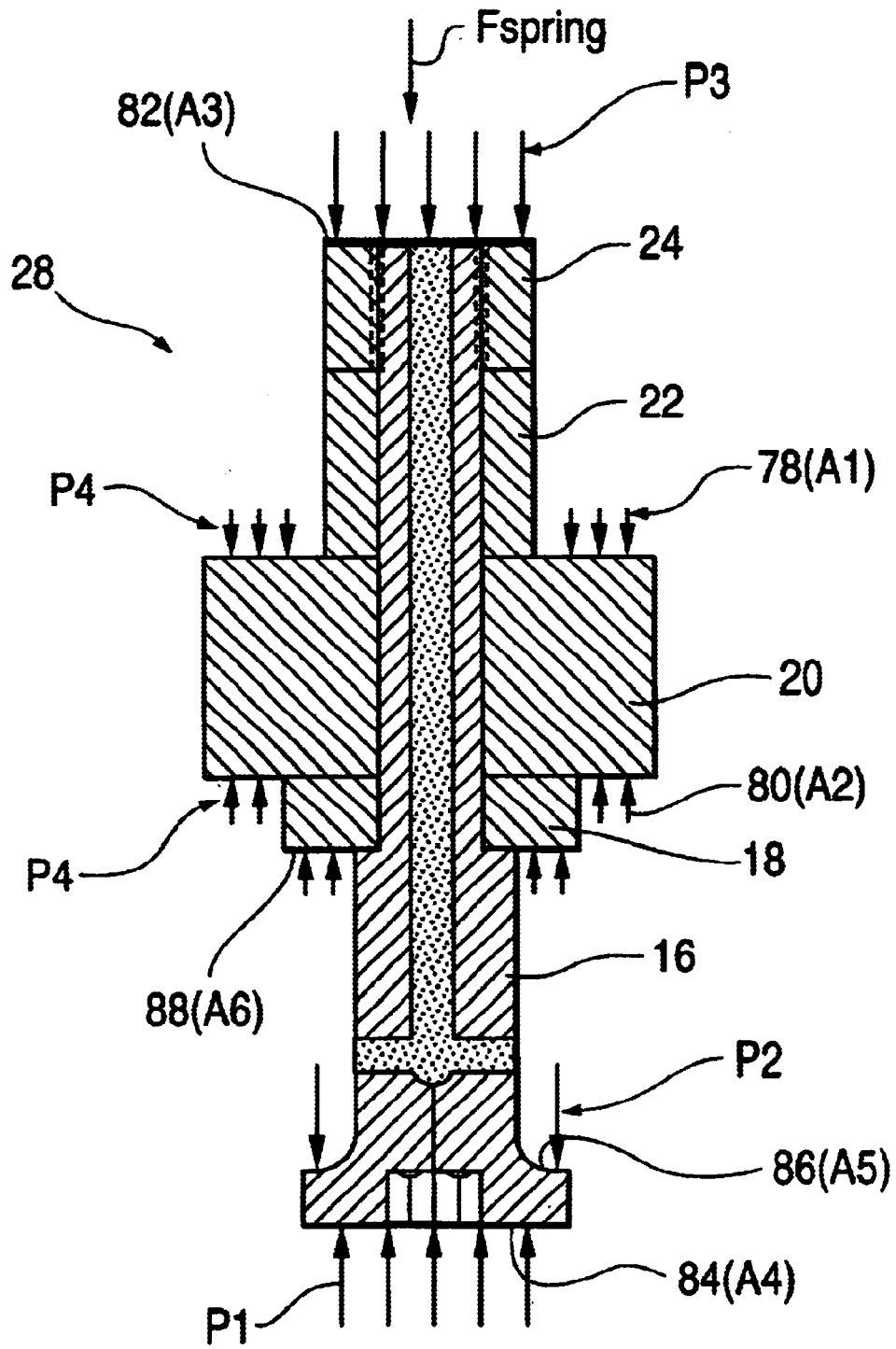
FIG. 7 is an enlarged cross-sectional view and free body diagram of the movable valve assembly of the valve of FIG. 5.

To illustrate how the forces on the valve assembly 28 may be balanced, FIG. 7 shows a free body diagram of the movable valve assembly 28 which includes the valve element 16, the spacer 18, the armature 20, the sleeve 22 and the nut 24. FIG. 7 details the various forces that result from the relative hydraulic pressures and the corresponding surfaces experiencing these pressures in the vertical direction only and during the spill mode. The armature 20 is exposed to the lowest pressure P4 on a first armature surface 78 and on a second armature surface 80. Additionally, the spacer 18 form a lower surface 88 which is also exposed to the lowest pressure P4. The sleeve 22 and the nut 24 has a second chamber surface 90 that is exposed to the second chamber pressure, P3. The movable valve element 16 has a pump chamber valve surface 84 that is exposed to the highest pressure, P1 and a surface on the back side 86 of the valve element 16 is exposed to a pressure P2 in the first chamber 72. The spring 42 also exerts a force, Fspring, on the second chamber surface 82 on the nut 24.

The net force acting to close the valve in the spill mode may be determined using the following equation:

Net Force=$P1(A4)-P2(A5)-P3(A3)+P4(A6+A2-A1)$−Fspring    (3)

Where:
  Fspring is the force exerted onto the nut 24 by the spring 42;
  P1 is the pressure of the fluid in the pump chamber 62;
  P2 is the pressure of the fluid in the first chamber 72;
  P3 is the pressure of the fluid in the second chamber 70;
  P4 is the pressure of the fluid in the annular cavity 60;
  A1 is the surface area of the first armature surface 78;
  A2 is the surface area of the second armature surface 80;
  A3 is the surface area of the second chamber surface 82;
  A4 is the surface area of the pump chamber valve surface 84;
  A5 is the surface area of the first chamber valve surface 86; and
  A6 is the surface area of the spacer 18.

Using this equation, the designer of a valve assembly may minimize the net force acting to close the valve over the operational flow rate range of the valve. Minimizing the net force acting to close the valve allows a reduction in the spring force that is required to maintain the valve open when the pump is in the spill mode. Additionally, if the force of the spring is reduced, the electromagnetic force that is required to be created by the valve actuator to close the valve to establish the pumping mode of FIG. 5 may also be reduced.

This exemplary embodiment reduces the net forces exerted on the valve assembly 28 by coordinating the sizes of the orifices, through which the fluid passes, with the surface areas of the valve assembly 28 exposed to the varying fluid pressures. In this first exemplary embodiment, the designer may choose to reduce the effective flow restriction of the valve assembly by increasing the contact diameter between the valve element 16 and the valve seat 14. The net force, as a function of the flow rate through the redesigned valve assembly, can be rebalanced by increasing the surface area A3 of the second chamber surface 82 by increasing the diameter of the sleeve 22. The valve assembly can be designed such that the net force acting to resist the closing of the valve element 16 increases rather than decreases with increasing flow rate through the valve assembly. This net force reversal can be designed in several manners such as by increasing the surface area A3 of the second chamber surface 82.

FIGS. 8–10 show a second exemplary embodiment of a valve 100 assembled to the pump body 154. The valve 100 is substantially the same as valve 10 of FIGS. 1–7, but with some variations. Valve 100 includes a sleeve 102 which has an outside diameter which is smaller than the second chamber 104 within the pole 106. The relatively large clearance between the sleeve 102 and the pole 106 and the relatively large clearance between the armature 136 and the valve body 110 result in the pressure in the second chamber 104 being only slightly higher than the pressure in the annular cavity 138 during the spill mode of operation shown in FIG. 9.

The valve 110 includes a spacer 114 that includes an annular cavity 116 at its lower surface 118 that is in fluid communication with fluid passage 120 that extends into annular cavity 122. A relatively small flow rate of fluid may leak into the annular cavity 116 at the contacting lower surface 118 of the spacer 114 and the valve body 110. This leakage path flow restriction is large compared to the fluid passage 120. In the spill mode of operation, as shown in FIG. 9, the pressure in the annular cavity 116 is approximately equal to the pressure in the annular cavity because of their fluid communication through the relatively large fluid passage 120.

In the spilling mode, the pressure in the annular cavity is lower than the pressure in the second chamber 104 and the pressures on all of the areas surrounding the armature 136. This pressure difference produces a net force on the surface of the annular cavity 116 and the equivalent surface area on the opposite side of the armature 136 which acts to resist the closing of the valve 110.

In both the filling and spilling modes of operation the leakage rate through contacting surface 118 is either non-existent or is very small. Because this passage is significantly more restrictive than the longitudinal bore 130, the clearances between the sleeve 102 and the pole 106, and the clearances between the armature 136 and the valve body 110, the pressures in first chamber 120, the second chamber 104 and the annular cavity 138 are nearly equal.

In this configuration, the pressure of the fluid between the cross-drilled orifices 108 and the valve seat 124 in the first chamber 128 extends not only through the longitudinal bore 130 of the valve 132 and into the second chamber 104 but also through areas surrounding the armature 136 and the spacer 114. The valve 100 has a valve body 110 that does not include the fluid communication passageway 54 of the first exemplary embodiment shown in FIGS. 1–7.

The second exemplary embodiment enables a designer to control the bias on the valve assembly 144 by varying the surface area of the annular cavity 116 in the spacer 114. If the forces are balanced properly, only a small force is required to be exerted by the spring 150 to maintain the valve 100 in an open configuration during the spill mode. Additionally, only a small actuation force is required to overcome the spring force to close the valve.

Also, in contrast to the first exemplary embodiment, the second exemplary embodiment eliminates one movable valve element mechanical guide. Eliminating the guide reduces manufacturing effort and improves reliability. As with the first embodiment, the net force which acts to resist the closing of the valve element 16 can be designed to increase as the flow rate through the valve assembly is increased.

Figure 11:
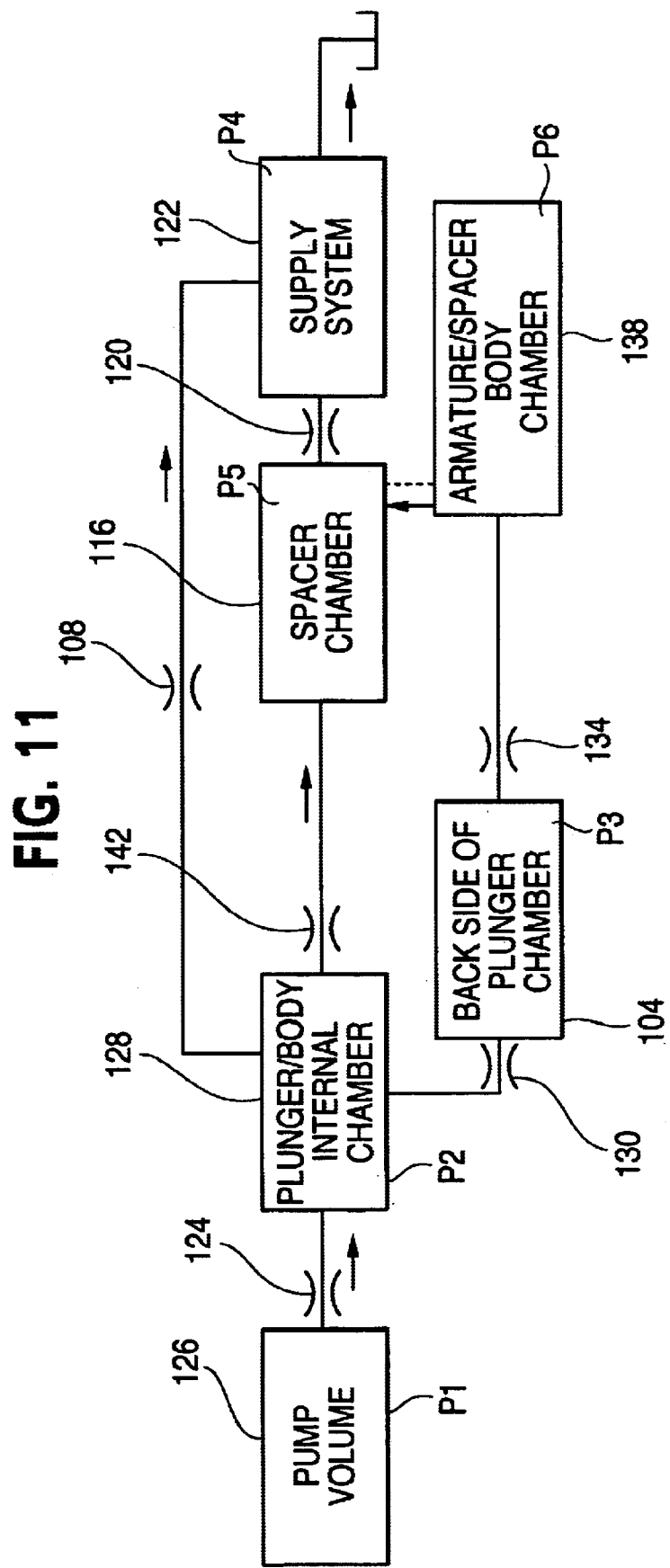
FIG. 11 is a schematic diagram of the flow through the second exemplary embodiment of the valve in the spill mode.

FIG. 11 is a schematic diagram of the flow through the second exemplary embodiment of the valve 100 in the spill mode. The flow proceeds from the pump chamber 126 at a pressure P1 past the valve seat 124 and into the first chamber 128 between the valve seat 124 and the cross-drilled orifices 108 in the valve body 110. The pressure of the fluid in the first chamber 128 is at a pressure P2. The flow then splits into three flow paths. The first flow path flows through the longitudinal bore 130 and into the second chamber 104 which is at fluid pressure P3. The first flow path continues through a first annulus 134 between the armature 136 and the valve body 110 into the annular cavity 138 surrounding the spacer 114. The pressure in the annular cavity 138 is P6. From the annular cavity 138, the first flow path continues between the gap 118 between the spacer 114 and the valve body 110 into the annular cavity 116 in the spacer 114. The annular cavity 116 is at a pressure P5. The second flow path flows from the first chamber 128 through the cross-drilled orifices 108 in the valve body 110 and into the annular cavity 122 at pressure P4. The third flow path flows from first chamber 128 through a second annulus 142 between the valve element 132 and the valve body 110 into the annular cavity 116 in the spacer 114. The first and third flow paths combine in the annular cavity 116 in the spacer 114 and flow through the fluid passage 120 into the annular cavity 122.

Figure 12:
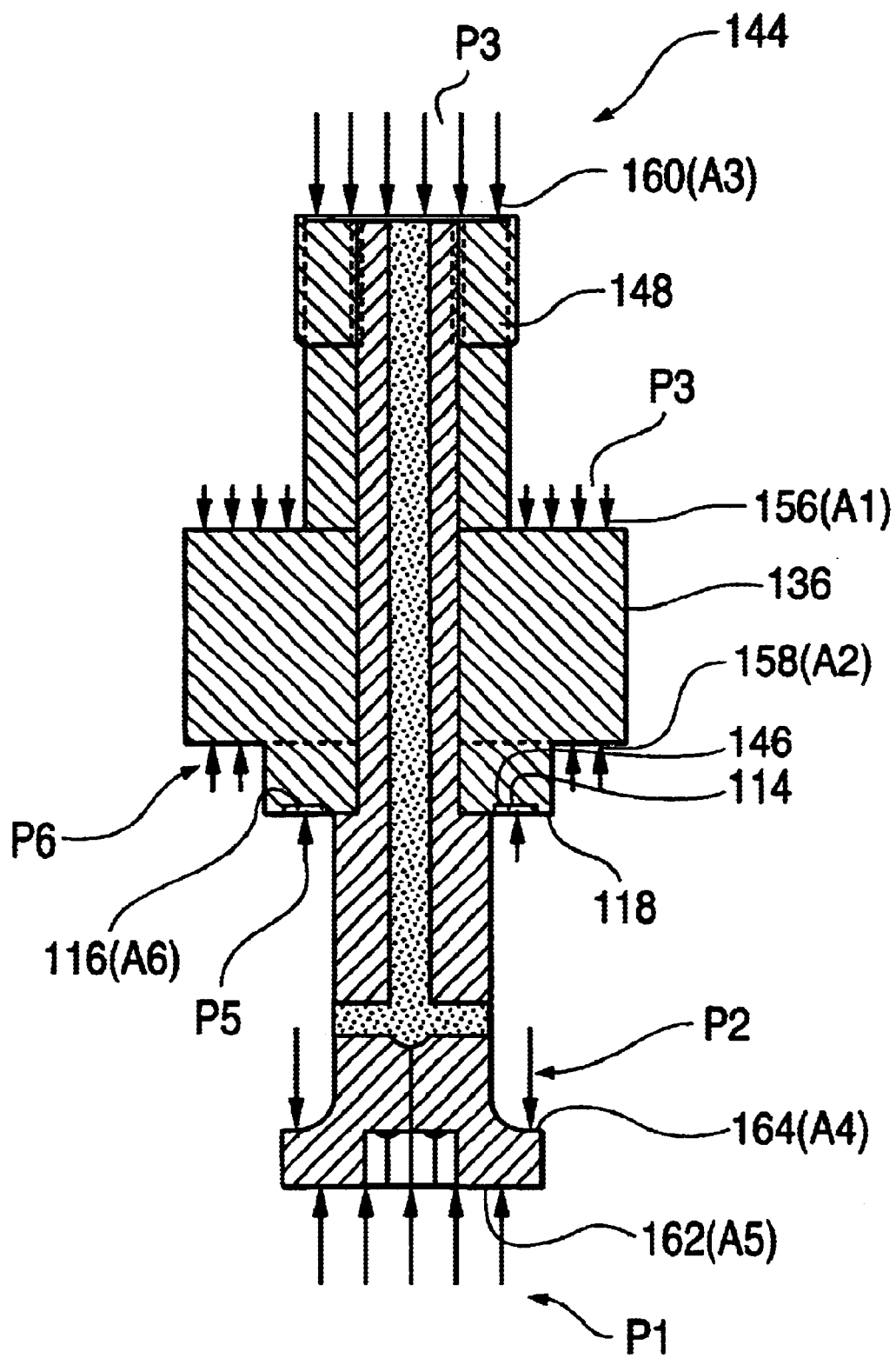
FIG. 12 is an enlarged cross-sectional view and free body diagram of the movable valve assembly of the valve of FIG. 9.

Similar to FIG. 7, FIG. 12 shows an enlarged cross-sectional view and free body diagram of the movable valve assembly 144 of the valve 100 of FIGS. 8–10. As explained above, the armature 136 is exposed to the pressure P3 of the fluid between the valve seat 124 and the cross-drilled orifices 108 in the valve body 110. Also, the spacer 114 has a lower surface 146 that has a surface area that is exposed to the pressure P4 of the fluid in the annular cavity 116. For the second exemplary embodiment, the force acting to close the valve during the spill mode, may be calculated using the following equation:

$$\text{Net Force} = P1(A5) - P2(A4) - P3(A1) + P5(A6) + P6(A2) - P3(A3) - F_{spring} \quad (4)$$

Where:
- $F_{spring}$ is the force exerted onto the nut 148 by the spring 150;
- P1 is the pressure of the fluid in the pump chamber 126;
- P2 is the pressure of the fluid in the first chamber 128;
- P3 is the pressure of the fluid in the second chamber 104;
- P4 is the pressure in the annular cavity 122;
- P5 is the pressure of the fluid in annular cavity 116 in the spacer 114;
- P6 is the pressure of the fluid in the annular cavity 138 surrounding the spacer 114;
- A1 is the surface area of the first armature surface 156;
- A2 is the surface area of the second armature surface 158;
- A3 is the surface area of the second chamber surface 160;
- A4 is the surface area of the first chamber surface 164 of valve element 132;
- A5 is the surface area of the pump chamber valve surface 162; and
- A6 is the surface area of the annular cavity 116 in the spacer 114.

It is to be understood that the valve assembly of the invention may be designed such that the bias of the forces on the movable valve assembly 144 that result from the fluid pressures may reduce reliance upon the spring. A valve assembly 144 may be designed in accordance with the invention such that the fluid pressures alone are sufficient to bias the movable valve open without any spring at all during the spill mode. For example, in the second exemplary embodiment of FIGS. 8–12, the spacer 114 may be increased in size to allow a larger annular cavity 116 in the spacer 114 such that the fluid pressures alone bias the movable valve assembly 144 open. However, it is also to be appreciated that the spring 150 may also be necessary to provide reliable positioning of the movable valve assembly when there is no fluid pressure.

Increasing the surface area A6 of the annular cavity 116 in the spacer 114 enables the use of larger cross-drilled orifices 108 in the valve body 110, thereby reducing the flow resistance and saving energy. Reducing the size of the sleeve 102 also frees up space for a larger wound coil 112 or for any other purpose. A larger wound coil 112 may provide a stronger actuation force. Although, a stronger actuation force may not be needed in view of the reduced requirement to overcome the spring force and the additional space may result in a much smaller wound coil 112 and, in turn, an overall smaller package. The valve 100 also includes a spacer 114 that includes an annular cavity 116 at a lower surface 118 that is in fluid communication with a fluid passage 120 that extends into annular cavity 122.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A valve for controlling the flow of fluid bi-directionally between an upstream supply and a downstream location, comprising:
   a valve body including a valve seat through which fluid may flow in both directions between the upstream supply and the downstream location, the valve body defining:
      a first chamber upstream of the valve seat;
      a second chamber in fluid communication with the first chamber; and
      a fluid flow path connecting the first chamber with the upstream supply,
   the fluid flow path having a predetermined upstream flow restriction;
   a valve assembly mounted in the valve body and moveable between a closed position and an open position, the valve assembly including a valve element with an enlarged portion positioned downstream of the valve seat that is adapted to engage the valve seat when the valve assembly is in the closed position, the valve assembly in communication with the fluid pressure within the first chamber, the second chamber, the downstream location and the upstream location such that the forces exerted upon the valve assembly by the fluid pressure bias the valve assembly to the open position when the fluid flows from the downstream location to the upstream supply;
   wherein the valve assembly further includes a spacer with an annular cavity on a lower surface which is in fluid communication with the upstream supply.

2. The valve of claim 1, further comprising a spring position in the valve body to bias the valve assembly toward the open position.

3. The valve of claim 1, wherein the valve body includes a cross-drilled orifice forming the predetermined upstream flow restriction and connecting the first chamber with the upstream supply.

4. The valve of claim 1, wherein the valve element includes a fluid communication passage connecting the first chamber with the second chamber.

5. The valve of claim 4, wherein the fluid communication passage comprises a cross-drilled orifice in communication with a longitudinal bore.

6. The valve of claim 1, wherein the valve body includes a lower projection receiving the valve seat and the cross-drilled orifices, the valve body also including an upwardly opening cavity with an upper threaded portion, the valve further comprising a pole at an upper portion having a spring receiving cavity, an externally threaded retainer engaging the upper threaded portion of the valve body and a shim in the spring receiving cavity of the pole, wherein the valve element has a radially enlarged lower end adapted to engage the valve seat in the closed position and a threaded portion at an upper end, wherein the valve assembly further includes an armature, a sleeve and a threaded nut, wherein the valve element extends through the annular spacer, the armature, the sleeve and the threaded nut, respectively, and wherein the threaded portion of the valve element engages the threaded nut and extends into the spring receiving cavity of the pole, and wherein the pole extends into the upwardly opening cavity of the valve body.

7. The valve of claim 1, wherein the valve body includes a fluid communication passage extending from a lower surface of the valve body to an upwardly opening cavity.

8. The valve of claim 1, wherein the valve assembly further includes an armature, a sleeve and a nut threadably engaging an upper threaded portion of the valve element and retaining the spacer, armature and sleeve on the valve element, wherein the valve includes a pole positioned within the valve body and receiving the valve assembly in a spring receiving cavity, wherein the outer diameter of the sleeve is smaller than the diameter of the spring receiving cavity.

9. The valve of claim 1, wherein the valve assembly further includes an armature, a sleeve and a nut threadably engaging an upper threaded portion of the valve element and retaining the spacer, armature and sleeve on the valve element, wherein the valve includes a pole positioned within the valve body and receiving the valve assembly in a spring receiving cavity, wherein the outer diameter of the sleeve is substantially the same diameter as the spring receiving cavity.

10. A valve for controlling the flow of fluid bi-directionally between an upstream supply and a downstream location, comprising:
    a valve body including a valve seat through which fluid may flow in both directions between the upstream supply and the downstream location, the valve body defining:
       a first chamber upstream of the valve seat;
       a second chamber in fluid communication with the first chamber; and
       a fluid flow path connecting the first chamber with the upstream supply, the fluid flow path having a cross-drilled orifice forming a predetermined upstream flow restriction and connecting the first chamber with the upstream supply;
    a valve assembly mounted in the valve body and moveable between a closed position and an open position, the valve assembly including a valve element with an enlarged portion positioned downstream of the valve seat that is adapted to engage the valve seat when the valve assembly is in the closed position and a spacer with an annular cavity on a lower surface which is in fluid communication with the upstream supply, the valve assembly in communication with the fluid pressure within the first chamber, the second chamber, the downstream location and the upstream location such that the forces exerted upon the valve assembly by the fluid pressure bias the valve assembly to the open position when the fluid flows from the downstream location to the upstream supply.

11. The valve of claim 10, further comprising a spring positioned in the valve body to bias the valve assembly toward the open position.

12. The valve of claim 10, wherein the valve element includes a fluid communication passage connecting the first chamber with the second chamber.

13. The valve of claim 12, wherein the fluid communication passage comprises a cross-drilled orifice in communication with a longitudinal bore.

14. The valve of claim 10, wherein the valve body includes a lower projection receiving the valve seat and the cross-drilled orifices, the valve body also including an upwardly opening cavity with an upper threaded portion, the valve further comprising a pole at an upper portion having a spring receiving cavity, an externally threaded retainer engaging the upper threaded portion of the valve body and a shim in the spring receiving cavity of the pole, wherein the valve element has a radially enlarged lower end adapted to engage the valve seat in the closed position and a threaded portion at an upper end, wherein the valve assembly further includes an annular spacer, an armature, a sleeve and a threaded nut, wherein the valve element extends through the annular spacer, the armature, the sleeve and the threaded nut, respectively, and wherein the threaded portion of the valve element engages the threaded nut and extends into the spring receiving cavity of the pole, and wherein the pole extends into the upwardly opening cavity of the valve body.

15. The valve of claim 10, wherein the valve body includes a fluid communication passage extending from a lower surface of the valve body to an upwardly opening cavity.

16. The valve of claim 10, wherein the valve assembly further includes a spacer with an annular cavity on a lower surface which is in fluid communication with the upstream supply.

17. The valve of claim 10, wherein the valve assembly further includes a spacer, an armature, a sleeve and a nut threadably engaging an upper threaded portion of the valve element and retaining the spacer, armature and sleeve on the valve element, wherein the valve includes a pole positioned within the valve body and receiving the valve assembly in a spring receiving cavity, wherein the outer diameter of the sleeve is smaller than the diameter of the spring receiving cavity.

18. The valve of claim 10, wherein the valve assembly further includes a spacer, an armature, a sleeve and a nut threadably engaging an upper threaded portion of the valve element and retaining the spacer, armature and sleeve on the valve element, wherein the valve includes a pole positioned within the valve body and receiving the valve assembly in a spring receiving cavity, wherein the outer diameter of the sleeve is substantially the same diameter as the spring receiving cavity.

19. A valve for controlling the flow of fluid bi-directionally between an upstream supply and a downstream location, comprising:
   a valve body including a valve seat through which fluid may flow in both directions between the upstream supply and the downstream location, the valve body defining:
      a first chamber upstream of the valve seat;
      a second chamber in fluid communication with the first chamber; and
      a fluid flow path connecting the first chamber with the upstream supply, the fluid flow path having a predetermined upstream flow restriction;
   a valve assembly mounted in the valve body and moveable between a closed position and an open position, the valve assembly including a valve element with an enlarged portion positioned downstream of the valve seat that is adapted to engage the valve seat when the valve assembly is in the closed position, the valve assembly in communication with the fluid pressure within the first chamber, the second chamber, the downstream location and the upstream location such that the forces exerted upon the valve assembly by the fluid pressure bias the valve assembly to the open position when the fluid flows from the downstream location to the upstream supply, wherein said valve element blocks flow between said downstream location and said first and said second chambers when in said closed position.

20. The valve of claim 19, further comprising a spring positioned in the valve body to bias the valve assembly toward the open position.

21. The valve of claim 19, wherein the valve body includes a cross-drilled orifice forming the predetermined upstream flow restriction and connecting the first chamber with the upstream supply.

22. The valve of claim 19, wherein the valve element includes a fluid communication passage connecting the first chamber with the second chamber.

23. The valve of claim 19, wherein the fluid communication passage comprises a cross-drilled orifice in communication with a longitudinal bore.

24. The valve of claim 19, wherein the valve body includes a lower projection receiving the valve seat and the cross-drilled orifices, the valve body also including an upwardly opening cavity with an upper threaded portion, the valve further comprising a pole at an upper portion having a spring receiving cavity, an externally threaded retainer engaging the upper threaded portion of the valve body and a shim in the spring receiving cavity of the pole, wherein the valve element has a radially enlarged lower end adapted to engage the valve seat in the closed position and a threaded portion at an upper end, wherein the valve assembly further includes an annular spacer, an armature, a sleeve and a threaded nut, wherein the valve element extends through the annular spacer, the armature, the sleeve and the threaded nut, respectively, and wherein the threaded portion of the valve element engages the threaded nut and extends into the spring receiving cavity of the pole, and wherein the pole extends into the upwardly opening cavity of the valve body.

25. The valve of claim 19, wherein the valve body includes a fluid communication passage extending from a lower surface of the valve body to an upwardly opening cavity.

26. The valve of claim 19, wherein the valve assembly further includes an armature, a sleeve and a nut threadably engaging an upper threaded portion of the valve element and retaining the armature and sleeve on the valve element, wherein the valve includes a pole positioned within the valve body and receiving the valve assembly in a spring receiving cavity, wherein the outer diameter of the sleeve is smaller than the diameter of the spring receiving cavity.

27. The valve of claim 19, wherein the valve assembly further includes an armature, a sleeve and a nut threadably engaging an upper threaded portion of the valve element and retaining the armature and sleeve on the valve element, wherein the valve includes a pole positioned within the valve body and receiving the valve assembly in a spring receiving cavity, wherein the outer diameter of the sleeve is substantially the same diameter as the spring receiving cavity.

28. A valve for controlling the flow of fluid bi-directionally between an upstream supply and a downstream location, comprising:

a valve body including a valve seat through which fluid may flow in both directions between the upstream supply and the downstream location, the valve body defining:
  a first chamber upstream of the valve seat;
  a second chamber in fluid communication with the first chamber; and
  a fluid flow path connecting the first chamber with the upstream supply, the fluid flow path having a predetermined upstream flow restriction;
a valve assembly mounted in the valve body and moveable between a closed position and an open position, the valve assembly including a valve element with an enlarged portion positioned downstream of the valve seat that is adapted to engage the valve seat when the valve assembly is in the closed position, the valve assembly in communication with the fluid pressure within the first chamber, the second chamber, the downstream location and the upstream location such that the forces exerted upon the valve assembly by the fluid pressure bias the valve assembly to the open position when the fluid flows from the downstream location to the upstream supply;
wherein the valve assembly further includes an armature, a sleeve and a nut threadably engaging an upper threaded portion of the valve element and retaining the armature and sleeve on the valve element, wherein the valve includes a pole positioned within the valve body and receiving the valve assembly in a spring receiving cavity, wherein the outer diameter of the sleeve is smaller than the diameter of the spring receiving cavity.

29. A valve for controlling the flow of fluid bi-directionally between an upstream supply and a downstream location, comprising:

a valve body including a valve seat through which fluid may flow in both directions between the upstream supply and the downstream location, the valve body defining:
  a first chamber upstream of the valve seat;
  a second chamber in fluid communication with the first chamber; and
  a fluid flow path connecting the first chamber with the upstream supply, the fluid flow path having a predetermined upstream flow restriction;
a valve assembly mounted in the valve body and moveable between a closed position and an open position, the valve assembly including a valve element with an enlarged portion positioned downstream of the valve seat that is adapted to engage the valve seat when the valve assembly is in the closed position, the valve assembly in communication with the fluid pressure within the first chamber, the second chamber, the downstream location and the upstream location such that the forces exerted upon the valve assembly by the fluid pressure bias the valve assembly to the open position when the fluid flows from the downstream location to the upstream supply;
wherein the valve assembly further includes an armature, a sleeve and a nut threadably engaging an upper threaded portion of the valve element and retaining the armature and sleeve on the valve element, wherein the valve includes a pole positioned within the valve body and receiving the valve assembly in a spring receiving cavity, wherein the outer diameter of the sleeve is substantially the same diameter as the spring receiving cavity.

* * * * *